(No Model.)
G. ARMS.
HOSE OR TUBING.
No. 308,730. Patented Dec. 2, 1884.
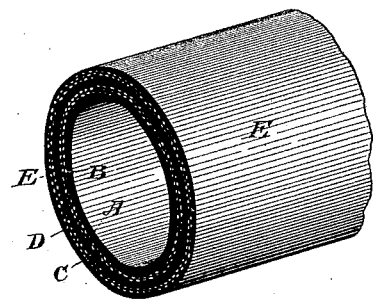
Attest
Geo. T. Smallwood.
Philip Mauro.
Inventor.
George Arms
By A. Pollok
his Atty.

UNITED STATES PATENT OFFICE.

GEORGE ARMS, OF NEW YORK, N. Y., ASSIGNOR TO THE NEW YORK BELTING AND PACKING COMPANY, OF SAME PLACE.

HOSE OR TUBING.

SPECIFICATION forming part of Letters Patent No. 308,730, dated December 2, 1884.

Application filed October 13, 1884. (No model.)

*To all whom it may concern:*

Be it known that I, GEORGE ARMS, of New York city, in the county and State of New York, have invented a new and useful Improvement in Rubber Hose or Tubing, which improvement is fully set forth in the following specification.

This invention has reference to hose or tubing of india-rubber and fibrous fabric inclosed between tubes of that material, and is particularly useful in connection with hose for air or vacuum brakes on railroad cars, although not limited to such use.

The object of the invention is to render the hose or tubing more durable and less liable to accidental rupture from rotting of the fibrous fabric.

The hose as heretofore made has consisted of three tubular layers united by vulcanization. The inner tube or layer has been of rubber. The second layer or tube has been composed of a sheet of fibrous fabric coated with rubber and wrapped one or more times around the lining or inner tube. The third or outer layer has been a rubber tube like the lining, but usually of less thickness. The strength of the hose lies mainly in the fibrous fabric. The rubber renders the hose impermeable, and also protects the fabric from the action of moisture and air. Notwithstanding, however, the fact that the fabric is completely covered both inside and outside with the tubular layers of rubber, it is still liable to lose its strength by decay. If a small crack or other imperfection exist, as it often may, in some part of the rubber cover or rubber lining, it gives access of moisture to the lining. The capillary attraction of the fibers composing the fabric causes the moisture to be absorbed and distributed. Although the fabric may be wrapped several times upon the lining, the moisture is carried by capillary attraction through all the windings. Decay soon follows the access of moisture and extends not to one only but to all the windings of fibrous fabric. It also gradually develops lengthwise of the hose until the strength of the latter for a considerable space around the original crack or imperfection is destroyed. The hose, therefore, although apparently unchanged, is liable, when subjected to pressure, to break or burst at any moment.

The importance of insuring against such ruptures in brake-tubes, which would be likely to occur under circumstances wherein they would be followed by a destructive accident, is sufficiently apparent. It is obvious, also, that in many other uses the danger to life or property likely to follow the rupture of hose or tubing may be great. The present invention if not an absolute protection against such accidents, yet reduces the danger of their occurrence very materially.

It consists in providing the hose or tubing with two distinct tubular wrappings of fibrous fabric wound upon the interior tube of rubber, and in interposing between the said tubular wrappings of fabric an impervious tube or tubular layer of india-rubber, so as wholly to separate or isolate the two fibrous fabrics from each other. The hose is provided as heretofore with a tubular cover of rubber. The effect of the improvement is that if either lining or outer cover should perchance admit moisture to the fibrous fabric beneath, the intermediate tube would effectually prevent the same from passing to the second layer of fibrous fabric. It is evident that more than two tubular layers of the wrapped fabric or fibrous material could be used, each separated from the adjacent one by an interposed impervious tube of rubber.

The invention does not include hose having seamless woven tubes inclosed by tubes of rubber, but is confined to hose in which sheets of fibrous fabric are wrapped upon the inner tube. Hose has heretofore been made, or it has been proposed to make hose, by inclosing one seamless woven tube inside another, and separating the one from the other by an interposed sheet or tube of rubber, the hose being further provided or not, as may be desired, with an impervious lining or cover, or both; but in such hose it is impossible to secure the strength of wrapped hose. Moreover, it is difficult and expensive to make. It is not adapted to the uses to which the improved hose may be put, and has not its advantages.

In the accompanying drawing a short length of the improved hose is shown in section and perspective.

A is the inner tube or lining of rubber. It is formed by wrapping a sheet or sheets of rubber prepared for vulcanization around a mandrel.

B is the inner fibrous fabric. It is formed of a sheet of cotton cloth or canvas coated with the vulcanizable-rubber compound and wrapped around the tube A as often as may be desired. As shown, it is wrapped twice with a lap.

C is the rubber tube or tubular layer, which is to isolate the layers of fibrous fabric. It is formed by wrapping a sheet of the prepared rubber around the fibrous fabric B, so as to completely envelop the same.

D is the second layer of fibrous fabric. To form it a sheet of rubber-coated cloth or canvas is wrapped around the intermediate or isolating tube, C.

E is the outer cover or tube of rubber, formed by wrapping a sheet of that material around the fibrous fabric last applied. After the five layers or tubes have all been formed one upon the other the hose is vulcanized in the usual way. It is calculated to make either of the two layers or tubes of fibrous fabric sufficiently strong to resist the whole pressure to which the hose will probably be exposed.

I claim—

The vulcanized-rubber hose or tubing comprising distinct wrappings of fibrous fabric in sheets in contradistinction to seamless woven tubes, with an interposed impervious tube or tubular layer of rubber completely isolating one sheet or wrapping from the other, said hose or tubing being further provided with a lining of rubber and also with an exterior rubber covering, substantially as described.

In testimony whereof I have signed this specification this 10th day of October, 1884.

GEO. ARMS.

In presence of—
PHILIP MAURO,
C. J. HEDRICK.